UNITED STATES PATENT OFFICE.

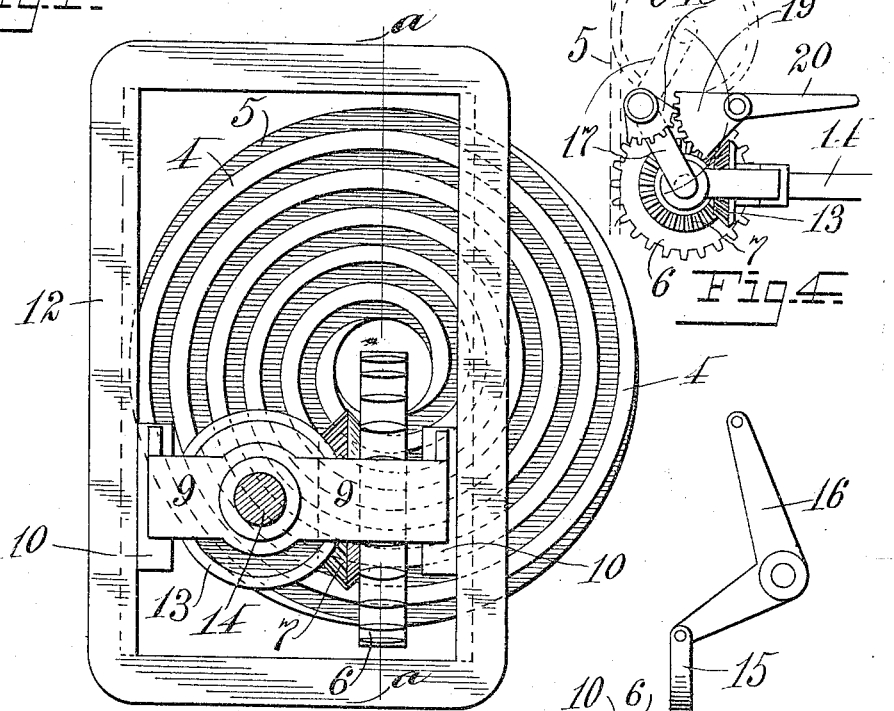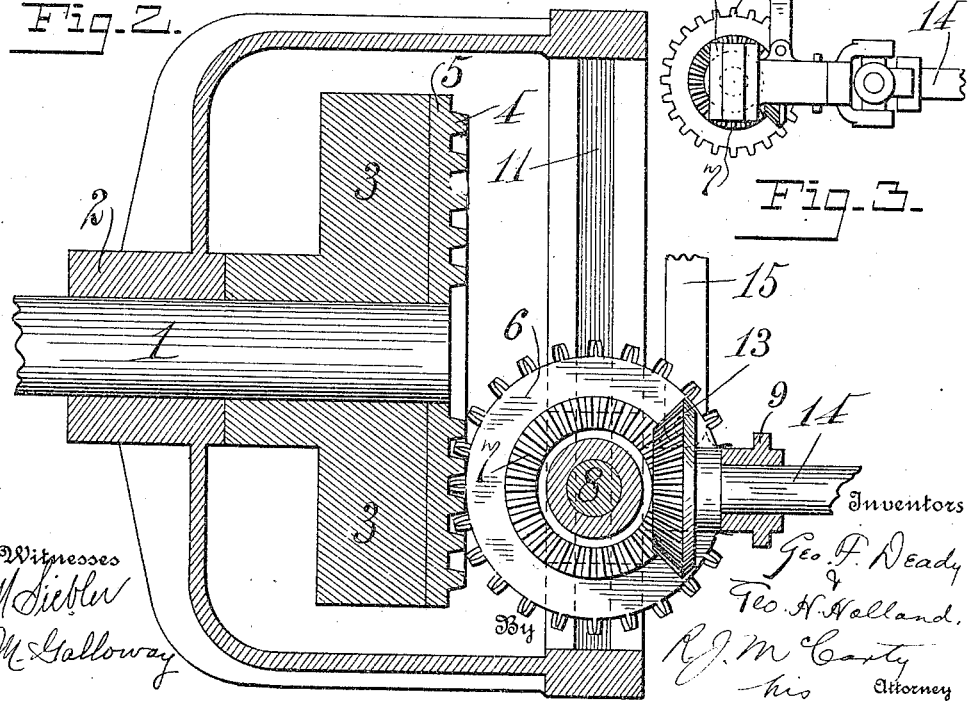

GEORGE F. DEADY AND GEORGE H. HOLLAND, OF DAYTON, OHIO, ASSIGNORS OF ONE-THIRD TO SAID DEADY, ONE-THIRD TO SAID HOLLAND, AND ONE-THIRD TO WILLIAM HAAS, ALL OF DAYTON, OHIO.

GEARING.

1,144,324.

Specification of Letters Patent.

Patented June 22, 1915.

Application filed September 22, 1913. Serial No. 790,987.

*To all whom it may concern:*

Be it known that we, GEORGE F. DEADY and GEORGE H. HOLLAND, citizens of the United States, residing at Dayton, in the county of Montgomery and State of Ohio, have invented certain new and useful Improvements in Gearing; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in gearing which is applicable to a variety of machines to be driven and especially for automobiles.

The object of the invention is to provide a type of gearing through which force may be greatly multiplied and a reversed direction of rotation easily obtained.

The force multiplying means comprises a plate which may be attached to a fly wheel or an integral part thereof. This plate is provided with multiple convolute or gear threads on a face thereof the convolutions of which lie parallel. With these threads a pinion is geared which is shiftable to opposite sides of the axis of the multiple threaded gear to change the direction of rotation of the driven member. The force transmitted to the driven member is multiplied in an inverse ratio to the reduction of the speed. The pinion is shiftable across the face of the multiple threaded gear. This may be done by any suitable shifting means of which two forms are shown in the drawing.

In the accompanying drawings, Figure 1 is a front elevation of our improved gearing; Fig. 2 is a sectional view on the line *a—a* of Fig. 1; Fig. 3 is a detail view of the means for shifting the pinion to obtain a reverse motion of the driven member; and Fig. 4 is a modified means for obtaining a reverse motion of the driven member.

In a detail description of the invention, similar reference characters indicate corresponding parts of the structure.

1 designates a driving shaft mounted in a bearing 2 and having fixed thereto a fly wheel 3. This fly wheel may be provided with double convolute threads 4 arranged on a face thereof and extending from near the axis thereof to the periphery as shown in Fig. 1. These convolute threads 4 may be arranged upon a plate 5 secured to the face of the fly wheel.

6 designates a spur pinion arranged to mesh with said convolute threads to be driven therefrom. It will be understood that a variation in the amount of force exerted upon the driven member is due to a variation between the number of teeth on the respective gears 4 and 6. The pinion 6 has a facial bevel gear 7 united thereto both of which are mounted upon a shaft 8 which in turn is journaled in sliding blocks 10. Said sliding blocks 10 fit in grooves 11 in the opposite side of a rectangular frame 12 which is suspended from the bearing 2. The said gears 6 and 7 may, therefore, be shifted in said frame to one or the other side of the axis of the convolute threaded gear 4 to reverse the direction of rotation of the gears 6 and 7. The bevel gear 7 is in mesh with a similar gear 13 which is fixed to a power transmission shaft 14. This shaft 14 may extend to the rear axle of an automobile to transmit the power thereto through a well known differential gear (not shown). Any suitable means may be provided for shifting the driven gear 6 to reverse the direction of movement of the driven shaft. In Fig. 3 an arm 15 is shown of which one is connected to each of the sliding blocks 10 and extended upwardly to a point where they are brought in contact with the lower arm of a bell crank lever 16, the upper arm of which may be connected to any suitable means for operating said lever to shift the cross head 9 and therewith the gear 6. By the use of this shifting means the pinion 6 remains in mesh with the convolute threads of the driving gear during the shifting movement. In Fig. 4, another means is shown for shifting the driven pinion 6 to reverse the direction of movement of the driven shaft. This last named means consists of a shaft having a crank 17 at each end and upon which is mounted the pinion 6 and gear 7. On the crank end of said shaft, opposite to that upon which the pinion 6 is mounted, a segment gear 18 is mounted which is engaged by the segment end 19 of an operating lever.

In operating the lever 20 the pinion 6 is moved outwardly and upwardly in an arc of a circle from engagement with the threads on the driving gear 4 and is shifted to the other side of the axis of said gear, as shown in Fig. 4. In this operation of shifting the driven pinion 6 the shaft 14 is permitted to have the necessary movement without disconnecting it with the member which it drives by providing the shaft 14 with the well known telescopic and universal joint by which it may be connected with the differential gear of the automobile axle.

Having described our invention, we claim:

A driving gear having convolute gear threads on a face thereof, a pinion in mesh therewith and driven therefrom, and means for shifting said pinion relative to the axis of the driving gear, whereby the direction of rotation of the pinion is reversed.

In testimony whereof we affix our signatures, in presence of two witnesses.

GEORGE F. DEADY.
GEORGE H. HOLLAND.

Witnesses:
R. J. McCARTY,
MATTHEW SIEBLER.